(12) United States Patent
Zukowski et al.

(10) Patent No.: US 10,796,681 B2
(45) Date of Patent: Oct. 6, 2020

(54) ACTIVE NOISE CONTROL FOR A HELMET

(71) Applicant: HARMAN BECKER AUTOMOTIVE SYSTEMS GMBH, Karlsbad (DE)

(72) Inventors: Paul Zukowski, Chamerau (DE); Gerhard Pfaffinger, Regensburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 401 days.

(21) Appl. No.: 15/550,728

(22) PCT Filed: Feb. 10, 2016

(86) PCT No.: PCT/EP2016/052814
§ 371 (c)(1),
(2) Date: Aug. 11, 2017

(87) PCT Pub. No.: WO2016/128458
PCT Pub. Date: Aug. 18, 2016

(65) Prior Publication Data
US 2018/0027917 A1 Feb. 1, 2018

(30) Foreign Application Priority Data
Feb. 13, 2015 (DE) .......................... 10 2015 202 703

(51) Int. Cl.
*H04R 1/10* (2006.01)
*A42B 3/30* (2006.01)
(Continued)

(52) U.S. Cl.
CPC .............. *G10K 11/178* (2013.01); *A42B 3/30* (2013.01); *A42B 3/303* (2013.01); *A42B 3/306* (2013.01);
(Continued)

(58) Field of Classification Search
CPC .......... H04R 1/10; H04R 1/40; H04R 1/1083; H04R 5/027; H04R 2460/01; A42B 3/30;
(Continued)

(56) References Cited

U.S. PATENT DOCUMENTS

| 5,138,664 A * | 8/1992 | Kimura ................ G10K 11/178 381/71.6 |
| 8,208,650 B2 * | 6/2012 | Joho .................... G10K 11/178 381/71.6 |

(Continued)

FOREIGN PATENT DOCUMENTS

| CN | 102007776 A | 4/2011 |
| CN | 102638747 A | 8/2012 |

(Continued)

OTHER PUBLICATIONS

Castane-Selga et al., "Active Noise Hybrid Time-Varying Control for Motorcycle Helmets", IEEE Transactions on Control Systems Technology, vol. 18, No. 3, May 2010, pp. 602-612.

*Primary Examiner* — Edgardo San Martin
(74) *Attorney, Agent, or Firm* — Brooks Kushman P.C.

(57) ABSTRACT

An automatic noise control system and method for a helmet with a rigid shell that is configured to spatially divide a shell interior from a shell ambiance include generating in connection with at least one loudspeaker disposed in the shell interior anti-sound in the shell interior based on at least one input signal. The anti-sound is configured to attenuate sound occurring in the shell interior through destructive superposition. The system and method further include providing the at least one input signal by at least one of picking up sound in the vicinity of the loudspeaker in the shell interior, picking up vibrations of the shell, and picking up sound in the vicinity of the shell exterior.

21 Claims, 7 Drawing Sheets

(51) Int. Cl.
| | |
|---|---|
| *G10K 11/178* | (2006.01) |
| *G10K 15/02* | (2006.01) |
| *H04R 1/02* | (2006.01) |
| *G06F 3/16* | (2006.01) |
| *H04R 1/00* | (2006.01) |
| *A42B 3/00* | (2006.01) |
| *G10K 11/16* | (2006.01) |

(52) U.S. Cl.
CPC ........ *G06F 3/165* (2013.01); *G10K 11/17837* (2018.01); *G10K 11/17881* (2018.01); *G10K 15/02* (2013.01); *H04R 1/028* (2013.01); *H04R 1/1008* (2013.01); *H04R 1/1041* (2013.01); *H04R 1/1083* (2013.01); *G10K 2210/1081* (2013.01); *G10K 2210/3044* (2013.01); *G10K 2210/3046* (2013.01); *H04R 2201/023* (2013.01); *H04R 2420/07* (2013.01); *H04R 2460/01* (2013.01); *H04R 2460/07* (2013.01); *H04R 2499/13* (2013.01)

(58) Field of Classification Search
CPC ...... A42B 3/303; A42B 3/306; G10K 11/178; G10K 11/175; G10K 11/17817; G10K 11/17821; G10K 11/17823; G10K 11/17825

See application file for complete search history.

(56) References Cited

U.S. PATENT DOCUMENTS

| | | | |
|---|---|---|---|
| 9,579,060 B1 | | 2/2017 | Lisy et al. |
| 10,134,381 B2 | * | 11/2018 | Pfaffinger ........ G10K 11/17883 |
| 10,186,248 B2 | * | 1/2019 | Zukowski ................ A42B 3/30 |
| 10,199,031 B2 | * | 2/2019 | Zukowski ................ A42B 3/30 |
| 10,360,891 B2 | * | 7/2019 | Christoph ............ G10K 11/178 |
| 2001/0046304 A1 | | 11/2001 | Rast |
| 2003/0071766 A1 | | 4/2003 | Hartwell et al. |
| 2005/0117754 A1 | | 6/2005 | Sakawaki |
| 2005/0249355 A1 | | 11/2005 | Chen et al. |
| 2007/0033029 A1 | | 2/2007 | Sakawaki |
| 2008/0256687 A1 | | 10/2008 | Spencer |
| 2008/0267416 A1 | | 10/2008 | Goldstein et al. |
| 2009/0046868 A1 | | 2/2009 | Engle et al. |
| 2010/0014685 A1 | | 1/2010 | Wurm |
| 2010/0033313 A1 | | 2/2010 | Keady et al. |
| 2010/0274564 A1 | | 10/2010 | Bakalos et al. |
| 2011/0130176 A1 | | 6/2011 | Magrath et al. |
| 2011/0261970 A1 | | 10/2011 | Hamelink et al. |
| 2011/0288860 A1 | | 11/2011 | Schevciw et al. |
| 2012/0102629 A1 | | 5/2012 | Lott et al. |
| 2012/0128166 A1 | | 5/2012 | Kim et al. |
| 2013/0034253 A1 | | 2/2013 | Nakayama |
| 2014/0185828 A1 | | 7/2014 | Helbling |
| 2015/0222977 A1 | | 8/2015 | Angel, Jr. |
| 2015/0305426 A1 | | 10/2015 | Lee et al. |
| 2017/0193981 A1 | * | 7/2017 | Christoph ............ H04R 1/1083 |
| 2018/0301137 A1 | * | 10/2018 | Pfaffinger ........ G10K 11/17853 |
| 2018/0376231 A1 | * | 12/2018 | Pfaffinger ............ H04R 1/1008 |

FOREIGN PATENT DOCUMENTS

| | | |
|---|---|---|
| CN | 203851280 U | 9/2014 |
| JP | H1085202 A | 4/1998 |
| JP | 2007016342 A | 1/2007 |
| JP | 2007036608 A | 2/2007 |
| JP | 2007212611 A | 8/2007 |
| WO | 2011018168 A1 | 2/2011 |

* cited by examiner

120
ACTIVE NOISE CONTROL FOR A HELMET

CROSS-REFERENCE TO RELATED APPLICATION

This application is the U.S. national phase of PCT Application No. PCT/EP2016/052814 filed on Feb. 10, 2016, which claims priority to DE Patent Application No. 102015202703.1 filed on Feb. 13, 2015, the disclosures of which are incorporated in their entirety by reference herein.

BACKGROUND

1. Technical Field

The disclosure relates to a system and method (generally referred to as a "system") for active noise control in a helmet.

2. Related Art

A motorcyclist's ability to hear while riding is a critical safety factor in the modern environment. Unfortunately, a motorcyclist's hearing may be impeded by noise such as engine noise, wind noise and noise caused by helmet design, among other things. High noise levels, such as those experienced by motorcyclists, may increase fatigue, impair reaction times and impede attention, effectively reducing the safety of the motorcyclists and those around him or her. Moreover, high intensity noise over long periods of time may have long-term consequences on a motorcyclist's hearing ability. At highway speeds, noise levels may easily exceed 100 dB(A) even when wearing a traditional helmet. This is particularly troublesome for daily motorcyclists as well as occupational motorcyclists, such as police officers, but also for pilots, military personal, and motor sports enthusiasts who wear a helmet.

To combat the noise, some motorcycle helmets use sound deadening material around the area of the ears. Other motorcyclists may opt to use earplugs to reduce noise and prevent noise induced hearing loss. Another way to reduce noise are built-in active noise cancellation systems. In all cases, the noise reduction may be too strong in some situations, e.g., may reduce or cancel desired sound, such as, to a certain degree, the motorcyclist's own motorcycle or other vehicles, sirens, horns and other warning signals around him or her. Or, noise reduction may be too weak for undesired sound in other situations, e.g., when the sound of the motorcyclist's own motorcycle or any other noise is too loud. The situation can become even more complicated when the motorcyclist listens to music which is, in some situations, desired sound, but which may not be desired when more important desired sound such as sound created by other vehicles, sirens, horns and other warning signals around the motorcyclist occur.

SUMMARY

An automatic noise control system includes a helmet with a rigid shell configured to spatially divide a shell interior from a shell ambiance, and at least one loudspeaker disposed in the shell interior. The system further includes an active noise control channel configured to generate in connection with the loudspeaker anti-sound in the shell interior based on at least one input signal, the anti-sound configured to attenuate sound occurring in the shell interior through destructive superposition, and at least one sensor configured to provide the at least one input signal, the at least one sensor being at least one of an internal acoustic sensor, a non-acoustic sensor and an external acoustic sensor. The internal acoustic sensor is disposed in the vicinity of the loudspeaker in the shell interior. The non-acoustic sensor is mechanically or acoustically coupled to the shell. The external acoustic sensor is mechanically or acoustically coupled to the shell.

An automatic noise control method for a helmet with a rigid shell that is configured to spatially divide a shell interior from a shell ambiance includes generating in connection with at least one loudspeaker disposed in the shell interior anti-sound in the shell interior based on at least one input signal. The anti-sound is configured to attenuate sound occurring in the shell interior through destructive superposition. The method further includes providing the at least one input signal by at least one of picking up sound in the vicinity of the loudspeaker in the shell interior, picking up vibrations of the shell, and picking up sound in the vicinity of the shell exterior.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

In the following description, all examples shown are related to a motorcyclist riding a motorcycle but are applicable to all other drivers wearing a helmet and driving any type of land, water or air vehicles. Noise is referred to herein as any undesired sound. Noise affecting a motorcyclist may have many sources, such as engine noise, road noise, wind noise, and other noise in the vehicle. As the speed of a vehicle increases, typically the most prominent source of noise is wind noise. Common to all types of noise experienced by a motorcyclist are vibrations that make their way to a motorcyclist's ear. In some cases, a helmet may increase the perceived amplitude of noise by transmitting vibrations from the environment directly to the motorcyclist's ears. For example, as a motorcyclist travels faster, the wind impacting the shell of his or her helmet will in turn create more vibration that the motorcyclist perceives as noise. This effect increases dramatically as speed increases.

A common helmet may comprise several layers, including a shell, a shock-absorbing layer, and a comfort layer. A helmet's shell is the outermost layer and is typically made from resilient, water-resistant materials such as plastic and fiber composites. The shell spatially divides (to some extent) a shell interior from a shell ambiance. A helmet's shock-absorbing layer, which is its primary safety layer, may be made out of a rigid, but shock-absorbing material such as expandable polystyrene foam. Although not typical, a helmet's fire-proof layer may be integrated and made of a closed-cell material such as vinyl-nitrile, which is both fire and water resistant. Further, this layer may have sound and thermo-insulating qualities and may be alternatively referred to as an acoustic layer. Finally, a helmet's comfort layer may be made of a soft material meant to contact with a motorcyclist's skin, such as cotton or other fabric blends as are known in the art. Other layers may be present as well, and some of the aforementioned layers may be omitted or combined.

Helmets may include ear-cups, which may be molded into the rigid portions of the helmet, such as the foam layer. The ear-cups may be static and merely provide space for a motorcyclist's ears and/or loudspeakers, so that a motorcyclist may listen to music or communicate over an electronic communication system. In some cases, the ear-cups may be mounted to the shell of the helmet so that they can articulate and provide better comfort to motorcyclists. Ear-cups may be either formed in a rigid material that is vibrationally coupled to the helmet's shell, or the ear-cup is directly connected to the helmet's shell. In both cases, vibrations from wind and other noise sources are readily transmitted from the shell of the helmet to the ear-cup and then to the motorcyclist's ears. This vibrational coupling in-turn creates irritating noise for the motorcyclist.

Figure 1:
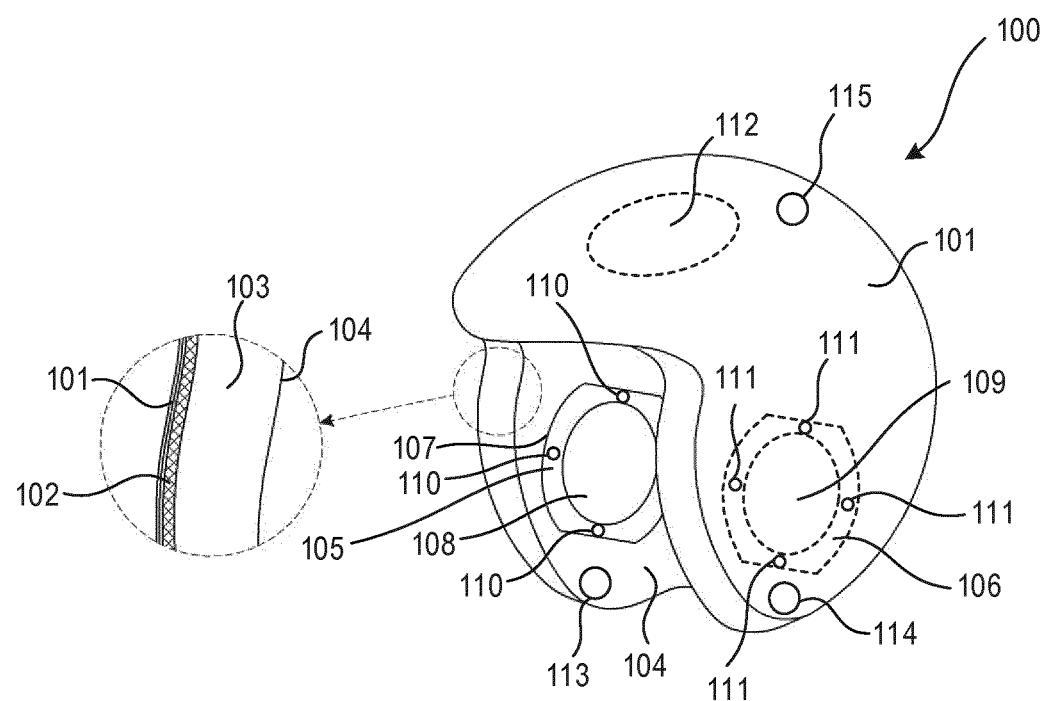
FIG. 1 is a perspective view of a motorcycle helmet with an active noise control system.

FIG. 1 is a perspective view of an exemplary motorcycle helmet 100. The helmet 100 comprises an outer shell 101, an acoustic layer 102, a foam layer 103, and a comfort layer 104. The acoustic layer 102 (in connection with foam layer 103 and/or comfort layer 104) may be constructed to form a passive noise reduction system. The helmet 100 further comprises ear-cups 105 and 106 which are mounted on each inner side of the helmet 100 where the ears of a user will be when the helmet 100 is worn by the user. Note that in FIG. 1 only one ear-cup 105 is visible. However, an identical ear-cup 106, shown in broken lines, is present on the opposite side of the helmet 100. The ear-cup 105 is (and so is ear-cup 106) isolated from the shell 101 of the helmet 100 by an isolation mount 107. The isolation mount 107 may be made of a vibration dampening material. The vibration dampening material may prevent shell vibrations from reaching a user's ear and thus may decrease the user's perception of those vibrations as noise. Thus, by mounting the ear-cup 105 to something other than the shell 101 of the helmet, and decoupling it from rigid materials that easily transmit vibrations, noise transmitted to the ear-cup 105 may passively be reduced.

Each ear-cup 105, 106 may partly embrace, for example, a loudspeaker 108, 109 or other type of sound driver or electro-acoustic transducer or a group of loudspeakers, built into the ear-cup 105, 106. Additionally, the helmet 100 may include one or more acoustic sensors such as microphone arrays 110 and 111 with each a multiplicity of, e.g., four, individual microphones which may be arranged in a circle around ear-cups 105 and 106 in the shell interior. Disposing a multiplicity of microphones in the vicinity of (e.g., around) the ear cups or loudspeakers allows for acoustically matching different ear positions such as with different persons wearing the helmet. The microphone arrays 110 and 111 sense noise and actively cancel the noise in conjunction with loudspeakers 108 and 109 and audio signal processor 112 at the positions of the microphone arrays 110 and 111, e.g., in each ear-cup 105 and 106. The loudspeakers 108 and 109 and the microphone arrays 110 and 111 are connected to an (analog and/or digital) audio signal processor 112 that may include an active noise reduction functionality. In this way, the benefits of passive noise reduction (as mentioned further above) and active noise reduction may be combined. The audio signal processor 112 may be partly or completely mounted within the shell 101 (i.e., in the shell interior) and may be vibrationally isolated from the shell 101 by vibration dampening material.

Alternatively, the audio signal processor 112 is completely disposed outside the helmet 100 and the loudspeakers 108, 109 and the microphone arrays 110 and 111 are linked via a wired or wireless connection to the audio signal processor 112. Furthermore, the audio signal processor 112—regardless of where it is disposed—may be linked via a wired or wireless connection to an audio signal bus system and/or a data bus system (both not shown in FIG. 1). The audio signal processor 112 may be further connected to at least one (further) acoustic or non-acoustic sensor such as acceleration sensors 113 and 114 which are mechanically coupled to (the inner or outer side of) the shell 101 and may be disposed at opposite sides of helmet 100. Additionally or alternatively to the non-acoustic sensors (acceleration sensors 113 and 114), at least one acoustic sensor, e.g., acoustic sensor 115, may be acoustically coupled to an external surface of the shell 101 (e.g., directed to the shell ambience).

Figure 2:
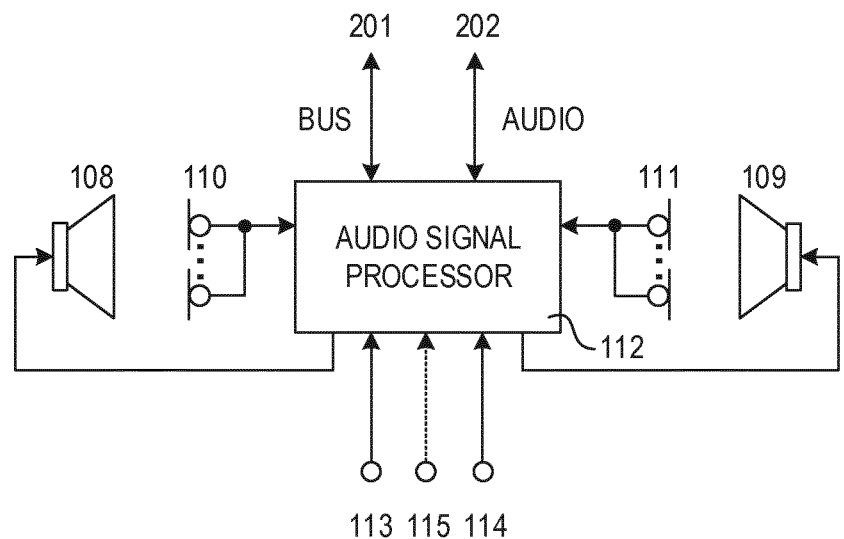
FIG. 2 is a signal flow diagram of an exemplary active noise controller applicable in the helmet shown in FIG. 1.

FIG. 2 is a signal flow chart of the system described above in connection with the helmet 100 shown in FIG. 1. Microphone arrays 110 and 111 provide to the audio signal processor 112 electrical signals that represent the sound picked up by the microphone arrays 110 and 111 at their respective positions. Acceleration sensors 113 and 114 (and/or acoustic sensor 115) provide to the audio signal processor 112 electrical signals that represent the vibrations of the shell 101 picked up by the acceleration sensors 113 and 114 at their respective positions. The audio signal processor 112 processes the signals from the microphones 110, 111 and acceleration sensors 113, 114, and produces signals therefrom that are supplied to the loudspeakers 108 and 109. The audio signal processor 112 may additionally transmit or receive data and/or audio signals via data bus 201 and/or audio signal bus 202. For example, audio signals transmitted via data bus 201 or audio signal bus 202 may be used to playback music or speech in the shell interior.

Figure 3:
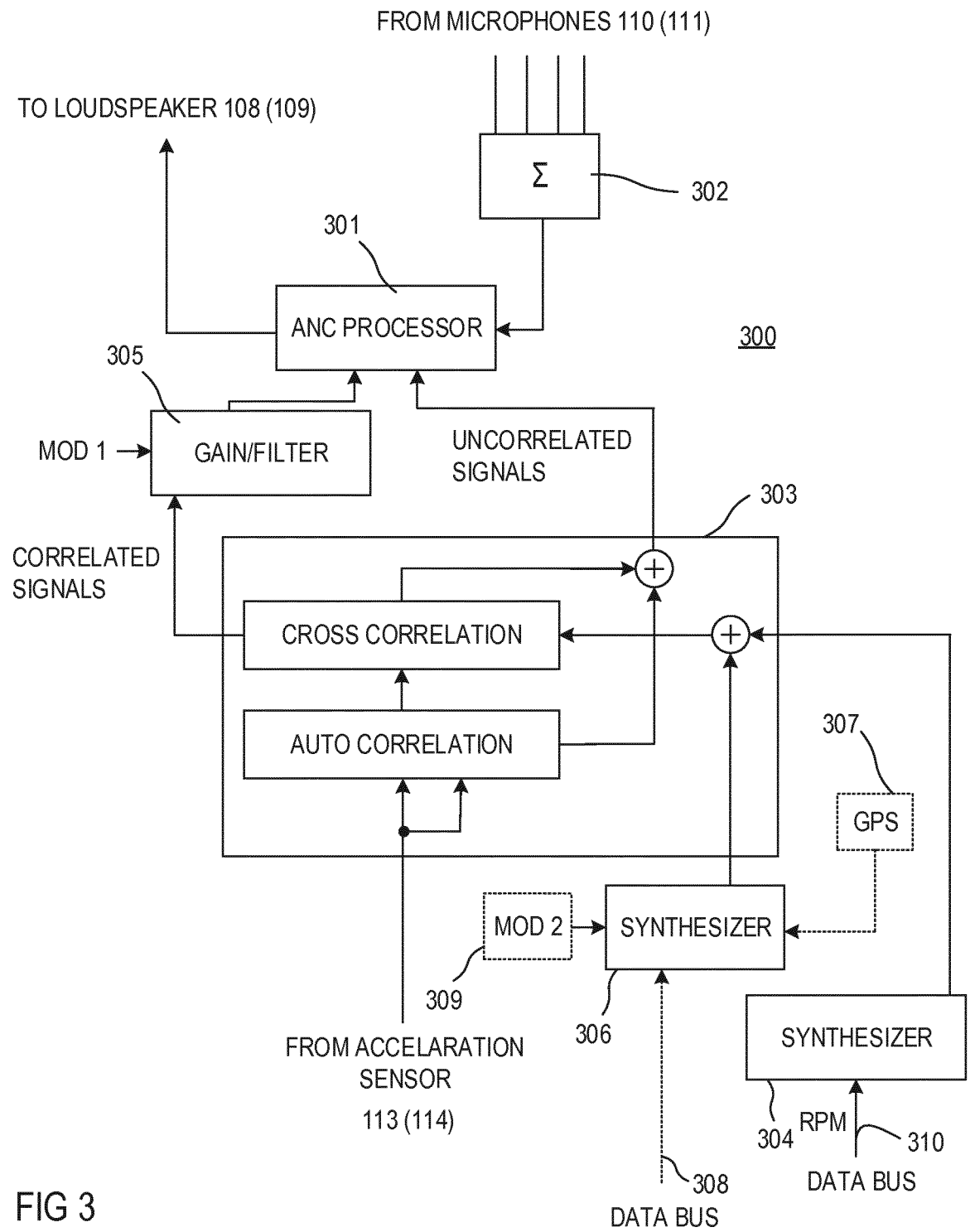
FIG. 3 is a signal flow diagram of one channel of the active noise controller shown in FIG. 2.

FIG. 3 shows one ANC channel 300 of the audio signal processor 112 described above in connection with FIG. 2. The other channel (not shown) may be implemented identically and connected to the respective other loudspeaker, microphones or acceleration sensor but receives and provides similar types of signals. ANC channel 300 includes an ANC processor 301 which receives a filter input signal from a single microphone, a microphone array or from a combiner 302 connected downstream of a multiplicity of microphones or a microphone array. The combiner 302 may be a summer that combines (sums up) the signals from a multiplicity, e.g., an array of microphones such as microphone arrays 110 and 111 in the arrangement shown in FIG. 1. The combiner 302 may be a plain summer as mentioned above or any other type of combiner, e.g., a weighting and/or filtering summer, multiplexer, (intelligent) switch etc.

Furthermore, ANC processor 301, which may include a fixed filter or an adaptive filter, supplies a filter output signal to loudspeaker 108 (or 109). The loudspeaker 108 (or 109), the array of microphones 110 (or 111) including the combiner 302 and the ANC processor 301 may form a feedback ANC structure or part of a combined feedforward feedback structure, in which the electrical path between the microphone array 110 (or 111) and the loudspeaker 108 (or 109) including the ANC processor 301 filters the signal from the microphone array 110 (or 111) before it is supplied to the loudspeaker 108 (or 109) so that the sound generated by the loudspeaker 108 (or 109) and transferred to the microphone array 110 (or 111) via an acoustic path between the loudspeaker 108 (or 109) and the microphone array 110 (or 111) reduces or cancels sound from other sources occurring at the position of the microphone array 110 (or 111).

In addition to the noise reducing structure, ANC channel 300 may include a correlator 303 (performing at least one of a cross-correlation or auto-correlation operation) that receives at least one of a signal from the acceleration sensor 113 (or 114) and a signal representing motorcycle characteristics such as the revolutions per minute (rpm) of its motor. The signal representing motorcycle characteristics may be transmitted via a wire-wired or a wireless data bus 310 and may include RPM data corresponding to the revolutions per minute (rpm) of the motor. These RPM data may be converted by a motor sound synthesizer 304 into an electrical sound signal representing the sound signal generated by the motorcycle (e.g., its motor) when operated with a particular rpm. Alternatively, the electrical sound signal representing the acoustic sound signal generated by the motor when operated with the particular rpm may be generated by another microphone (not shown) that picks up the original motor sound in close vicinity of the motor, and may be transferred to correlator 303 by way of the data bus 310.

Correlator 303 may cross-correlate the essentially harmonic signal from the motor sound synthesizer 304 with a signal from the acceleration sensor 113 (or 114) which is a signal that includes harmonic signal components and non-harmonic components. Alternatively or additionally, an auto-correlation operation may be applied to the signal from sensor 113 (or 114), e.g., before performing the cross-correlation operation. The acceleration sensor 113 (or 114) in connection with the outer shell forms not only a vibration sensor but also a kind of microphone that picks-up ambient sound in the vicinity of the helmet 100 and sound generated by or occurring at the helmet 100. The acceleration sensor 113 (or 114) in connection with the outer shell is less sensitive to direct wind noise which may cause incorrect measurements of the actual ambient sound when using common microphones.

Correlator 303 outputs signals that are harmonic or correlate with the harmonic motor sound (referred to as correlated components) and non-harmonic signals or signals that do not correlate with the harmonic motor sound (referred to as uncorrelated components). The correlated components correspond to harmonic motor sound contained in the signal from the acceleration sensor 113 (or 114). This motor sound component may be added in an attenuated and/or filtered manner by a gain/filter module 305 to the signal supplied to the loudspeaker 108 (or 109) by ANC processor 301 so that it is presented to the user wearing the helmet 100 in an audible but pleasant way. The gain/filter module 305 includes different modes of operation which can be controlled by a signal which allow the user to tune the sound presented to him or her. Optionally, the uncorrelated component of the signal from the acceleration sensor 113 (or 114), which includes noise contained in the signal from the acceleration sensor 113 (or 114), may be supplied to ANC processor 301 in order to implement a feedforward structure or a combined feedback-feedforward structure as detailed further below.

Alternatively or in addition to the signal representing the motor sound, a signal representing other desired harmonic components with specific frequency characteristics of cars, other motorcycles, horns or sirens may form the basis for the correlation operation. This signal may be generated by a specific warning sound synthesizer 306, which may include different modes of operation to address different sound situations such as varying warning signals in different countries etc. and can be tuned by way of a signal MOD2, which allows the user to select the warning sound he or she wishes to hear. Signal MOD1 allows again tuning the sound presented to the user. Additionally or alternatively, different control signals may be stored in a memory or transmitted via wired or wireless connection dependent on the position that the helmet is currently in. The position may be determined, e.g., by a Global Positioning System (GPS) 307 and the position is used to select the desired harmonic components for a particular position to be extracted from the signal provided by the acceleration sensor 113 (or acceleration sensor 114 or microphone 115), e.g. warning signals typical for the respective position, maybe in connection with respective control data provided as signal MOD2 by a data memory 309 or via a data bus 308.

Figure 4:
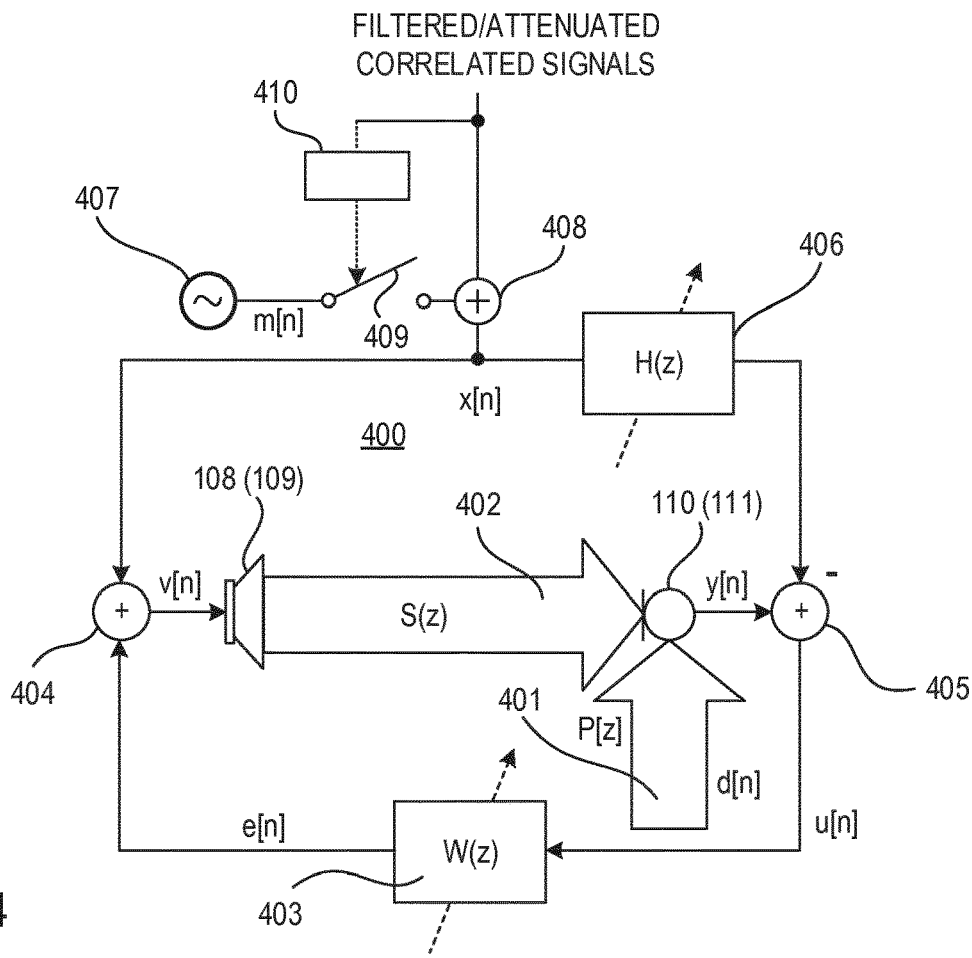
FIG. 4 is a signal flow diagram of a first exemplary active noise control processor applicable in the active noise control processor shown in FIG. 3.

Referring to FIG. 4, in a feedback type ANC processor 400, which may be used to form a feedback structure or part of a combined feedforward feedback structure in ANC processor 301 in the arrangement shown in FIG. 3, a disturbing signal d[n], also referred to as noise signal, is transferred (radiated) to a listening site, e.g., the user's ear, via a primary path 401. The primary path 401 has a transfer characteristic of P(z). Additionally, an input signal v[n] is transferred (radiated) from a loudspeaker, such as loudspeaker 108 (or 109), to the listening site via a secondary path 402. The secondary path 402 has a transfer characteristic of S(z). A microphone or an array of microphones, such as microphone 110 (or 111), positioned at the listening site, receives the signals that arise from the loudspeaker 108 (or 109) and the disturbing signal d[n]. The microphone 110 (or 111) provides a microphone output signal y[n] that represents the sum of these received signals. The microphone output signal y[n] is supplied as filter input signal u[n] to a feedback ANC filter 403 that outputs to an adder 404 an error signal e[n]. The feedback ANC filter 403, which may be an adaptive filter, has a transfer characteristic of W(z). The adder 404 also receives the attenuated or pre-filtered, correlated signal as input signal x[n] from correlator 303 and provides an output signal v[n] to the loudspeaker 108 (or 109). In addition to or instead of the adder 404 a subtractor 405 may subtract the input signal x[n] from the microphone output signal y[n] to form the feedback ANC filter input signal u[n]. Thus, the desired correlated sound may be injected into the feedback loop either via adder 404 or subtractor 405 or both adder 404 and subtractor 405. Optionally, the attenuated or pre-filtered, correlated signal forming input signal x[n] may be filtered by an additional filter 406 with a transfer function H(z), e.g., a low-pass filter characteristic, before it is supplied to subtractor 405.

Signals X(z), Y(z), V(z), E(z) and U(z) represent in the spectral domain (z-domain) the (discrete) time domain signals x[n], y[n], v[n], e[n] and u[n], so that the differential equations describing the system illustrated in FIG. 4 are as follows:

$$Y(z)=S(z)\cdot V(z)=S(z)\cdot(E(z)+X(z)),$$

$$E(z)=W(z)\cdot U(z)=W(z)\cdot(Y(z)-H(z)\cdot X(z)),$$

and assuming that $H(z) \approx S(z)$ then $E(z)=W(z)\cdot U(z) \approx W(z)\cdot(Y(z)-S(z)\cdot X(z))$.

Optionally, a desired signal such as music or speech may be played back with the ANC processor 400, e.g., by adding, e.g., by way of an adder 408, a desired signal m[n] from a source 407 to the correlated signals to form the input signal x[n]. The desired signal m[n] may be muted by way of a controllable (soft) switch 409 when a signal detector 410 detects correlated signals. For example, when a warning signal such as horn or siren is to be reproduced by the ANC processor 400, the switch 409 mutes, i.e., (soft) switches the music (e.g., represented by desired signal m[n]) off as long as the warning signal is present.

Figure 5:
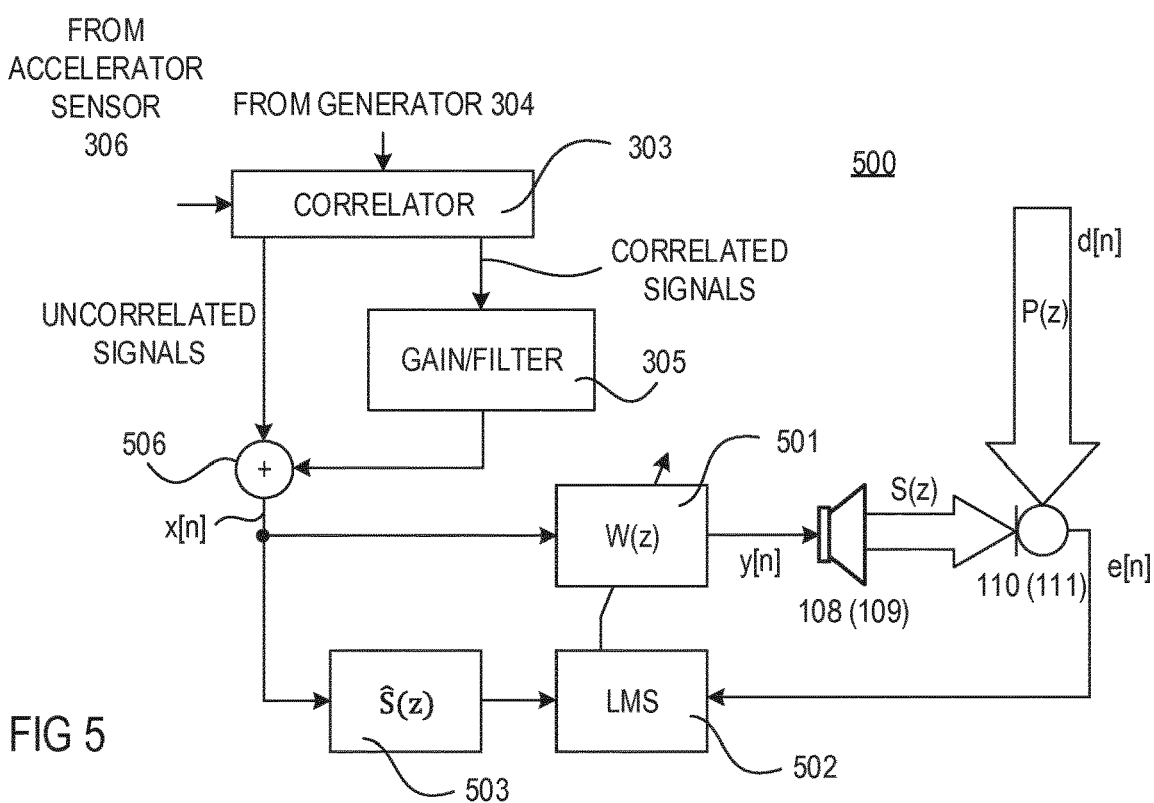
FIG. 5 is a signal flow diagram of a second exemplary active noise control processor applicable in the active noise control processor shown in FIG. 3.

FIG. 5 is a block diagram of an exemplary feedforward ANC processor 500 which employs the filtered-x least mean square (fxLMS) algorithm and which may be used as or in ANC processor 301 in FIG. 3. In FIG. 5, the primary path is again denoted P(z), the secondary (or forward) path again S(z), the estimate of the secondary path Ŝ(z), the adaptive filter transfer function W(z), the input signal x[n], the output from the adaptive filter y[n], the primary noise signal d[n], and the error signal e[n].

In the feedforward ANC processor shown in FIG. 5, the correlated signals from correlator 303 and the attenuated or pre-filtered, correlated signal from the gain/filter module 305 are summed up by an adder 506 to provide input signal x[n] which is supplied to an adaptive filter 501 and a filter 503. The adaptive filter 501 supplies the signal y[n] to the loudspeaker 108/109 and has the transfer function W(z) which is controlled by a least mean square (LMS) module 502. The LMS module 502 receives the error signal from the microphone 110/111 and a signal from filter 503. The signal from filter 503 represents the input signal x[n] filtered with a transfer function that is the estimate of the secondary path Ŝ(z). The time domain signals x[n], y[n], d[n] and e[n] of the system in FIG. 5 correspond to the z-domain signals X(z), Y(z), D(z) and E(z). Assuming that the adaptive filter is time invariant, the signals of the system in FIG. 5 can be written in the z-domain as:

$$E(z)=P(z)\cdot X(z)+S(z)\cdot Y(z)=(P(z)+S(z)\cdot W(z))\cdot X(z)$$

The goal of the adaptive filter 501, which means transfer function W(z), is to minimize the error E(z) which in an ideal case will equal zero after the convergence of transfer function W(z). Hence, setting E(z)=0 in the above equation gives the optimal filter as: W(z)=−P(z)/S(z).

Figure 6:
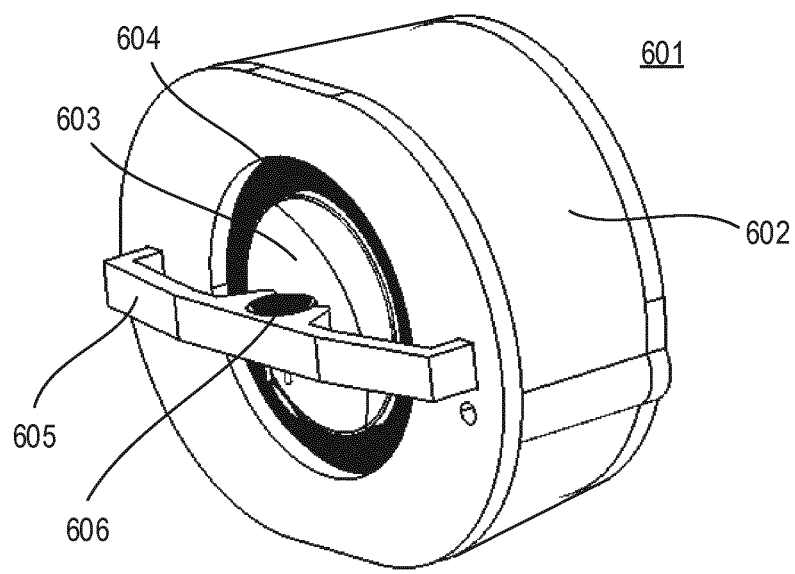
FIG. 6 is a perspective view of an exemplary microphone loudspeaker combination for use in the helmet as shown in FIG. 1.
Figure 7:
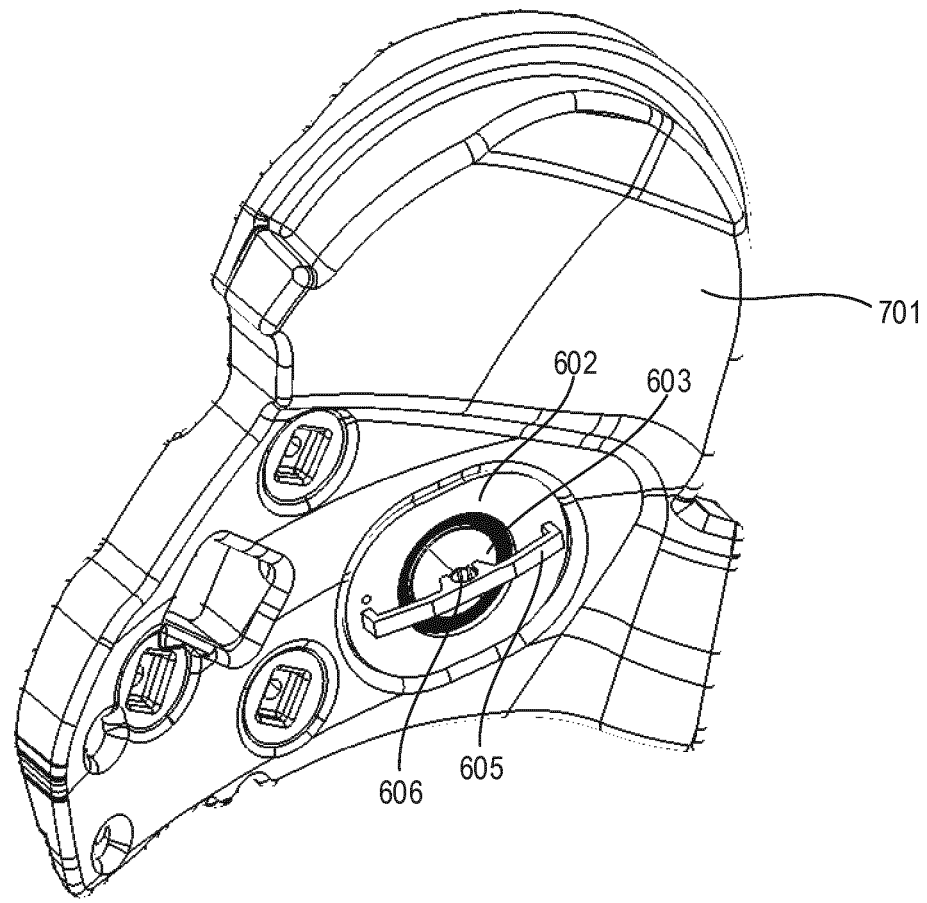
FIG. 7 is a perspective view of a cheek piece for use in the helmet as shown in FIG. 1, the cheek piece including the microphone loudspeaker combination shown in FIG. 6.

FIG. 6 is a perspective view of an exemplary microphone loudspeaker combination 601 used in the helmet shown in FIG. 1 instead of the ear cups 105 and 106. In contrast to the ear cups 105 and 106, the microphone loudspeaker combination 601 is directly mounted into the shell without any noise damping encapsulation. The microphone loudspeaker combination 601 includes an enclosure 602 accommodating a loudspeaker 603. The loudspeaker 603 is disposed in the interior of the enclosure 602 and has a front face that covers an opening 604 in the enclosure 602. On the exterior side of the opening 604, i.e., in front of the loudspeaker 603, a crosspiece 605 crosses the opening 604. The crosspiece 605 supports a single microphone 606 which is directed parallel to area of the opening 604. Instead of a single microphone, an array of microphones may be used. FIG. 7 is a perspective view of a cheek piece 701 for use in the interior of the helmet shown in FIG. 1. The cheek piece 701 may be made from plastic such as EPS and may be covered with soft fabric (not shown). The microphone loudspeaker combination 601 may be press fit into the cheek piece 701 at the position of the ears of a helmet user without any further damping measures.

Figure 8:
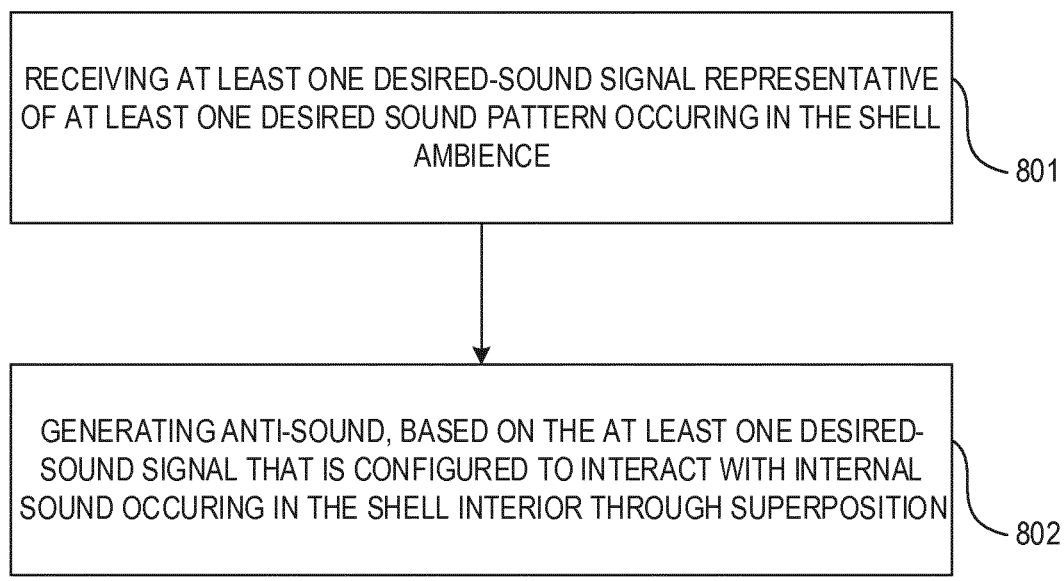
FIG. 8 is a process flow chart illustrating an exemplary active noise control method applicable in the active noise control system shown in FIG. 2.

FIG. 8 illustrates an exemplary active noise reduction method for a helmet as can be performed e.g. by the system shown in FIGS. 1-7. The helmet has a rigid shell that spatially divides a shell interior from a shell ambiance. In a process 801, at least one desired-sound signal representative of at least one desired sound pattern occurring in the shell ambience is received. In a process 802, generating, based on the at least one desired-sound signal, anti-sound that is configured to interact with internal sound occurring in the shell interior through superposition. The internal sound comprises first internal sound components and second internal sound components, the first internal sound components not corresponding to the at least one desired sound pattern and the second internal sound components corresponding to the at least one desired sound pattern. The anti-sound is further configured to attenuate the first internal sound components, and to amplify, not attenuate, or attenuate to a lesser degree than the first internal sound components the second internal sound components.

Figure 9:
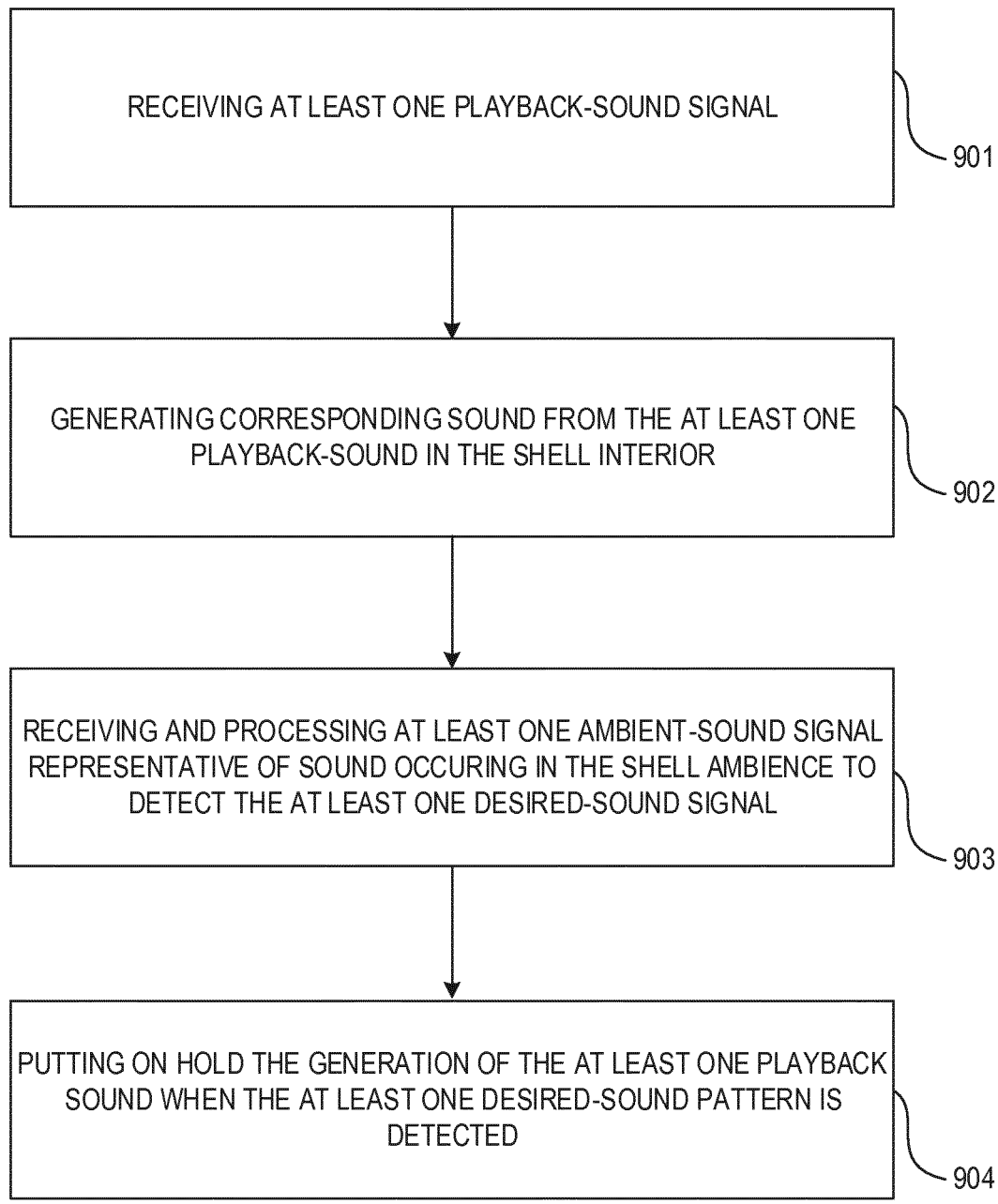
FIG. 9 is a process flow chart illustrating an exemplary awareness method for a helmet.

FIG. 9 illustrates an exemplary awareness method for a helmet with a rigid shell that spatially divides a shell interior from a shell ambiance. In a procedure 901, at least one playback-sound signal is received. In a procedure 902, from the at least one playback-sound signal playback corresponding sound is generated in the shell interior. A procedure 903 includes receiving and processing at least one ambient-sound signal representative of sound occurring in the shell ambience to detect the at least one desired-sound signal. The generation of the at least one playback sound is put on hold when the at least one desired-sound pattern is detected (procedure 904).

Figure 10:
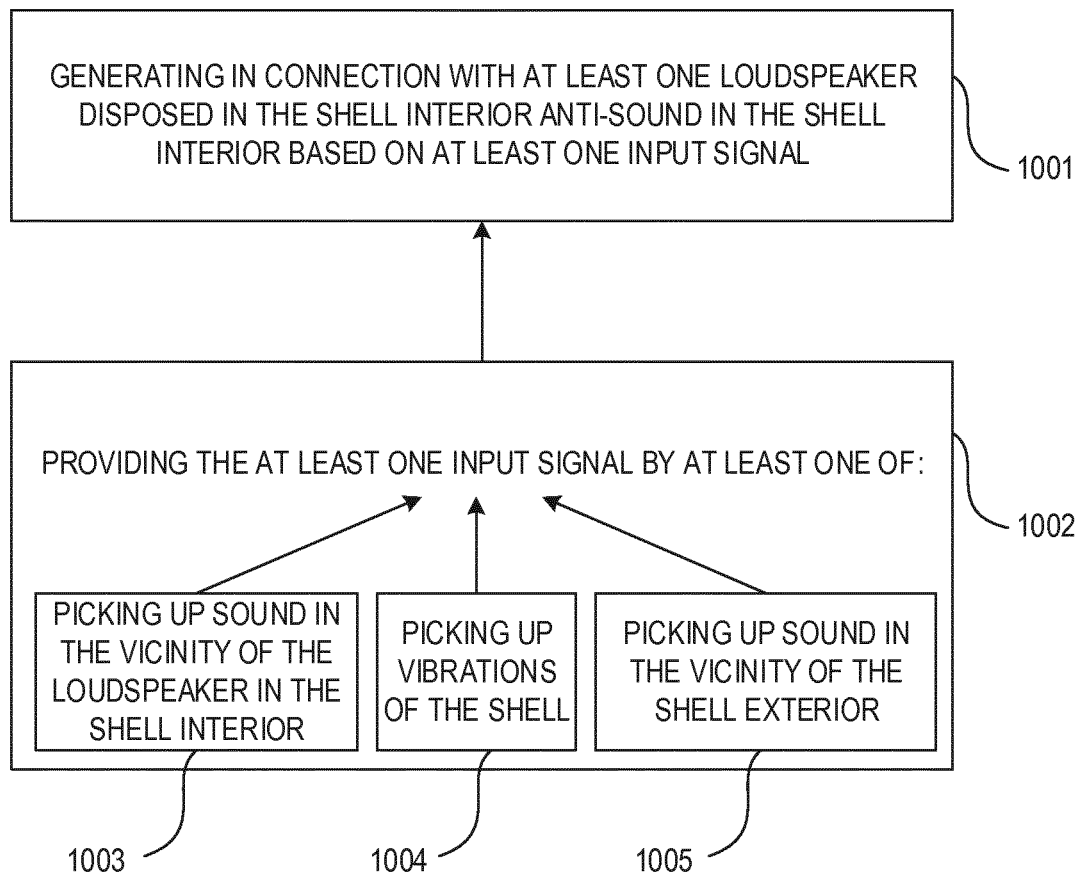
FIG. 10 is a process flow chart illustrating automatic noise control method for a helmet.

Referring to FIG. 10, an exemplary automatic noise control method for a helmet with a rigid shell that is configured to spatially divide a shell interior from a shell ambiance may include generating in connection with at least one loudspeaker disposed in the shell interior anti-sound in the shell interior based on at least one input signal (procedure 1001). The anti-sound is configured to attenuate sound occurring in the shell interior through destructive superposition. A procedure 1002 includes providing the at least one input signal by at least one of: picking up sound in the vicinity of the loudspeaker in the shell interior (sub-procedure 1003); picking up vibrations of the shell (sub-procedure 1004); and picking up sound in the vicinity of the shell exterior (sub-procedure 1005).

The helmet, system, method and software described herein allows for attenuating, reducing or cancelling non-harmonic sound such as, for example, noise generated by wind or rain. However, all or selected harmonic signals such as, for example, the motorcycle's motor sound, sirens and horns are only reduced to a pleasant degree. Furthermore, music can be muted when warning signals etc. occur to direct the motorcyclist's full attention to the warning signal.

It is noted that all filters shown above can be fixed, controlled or adaptive filters, and can be realized, as all other signal-processing parts in the above examples, in analog or digital hardware or in software. The filters can have any structure and can be of any type (e.g., finite impulse response, infinite impulse response) applicable. The numbers of loudspeakers, microphones and ANC channels used are unlimited and these may be arranged in any constellation possible (e.g., two groups of each four microphones in connection with two ANC channels, two non-acoustic sensors and two loudspeakers, or two groups of each two microphones in connection with one ANC channel per microphone, one non-acoustic sensor and two loudspeakers, etc. The ANC channels may have any structure that is applicable, e.g., a feedback, feedforward or combined feedforward-feedback structure. Furthermore, instead of a cross-correlation operation on the signal from the non-acoustic sensor and the signal representing motor or motorcycle characteristics, a cross-correlation operation may be applied solely to the signal from the non-acoustic sensor. Instead of non-acoustic sensors, acoustic sensors may be used. Motorcycle helmets as described herein include all types of helmets that can be used in a similar way. Furthermore, the system and methods described above can be used with all types of active noise control systems.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The invention claimed is:

1. An automatic noise control system comprising:
a helmet with a rigid shell configured to spatially divide a shell interior from a shell ambiance;
at least one loudspeaker disposed in the shell interior;
an active noise control processor configured to generate in connection with the at least one loudspeaker, anti-sound in the shell interior based on at least one input signal, the anti-sound configured to attenuate sound occurring in the shell interior through destructive superposition;
at least one sensor configured to provide the at least one input signal, the at least one sensor being at least one of an internal acoustic sensor, a non-acoustic sensor and an external acoustic sensor; wherein:
the internal acoustic sensor is disposed in a vicinity of the at least one loudspeaker in the shell interior;
the non-acoustic sensor is mechanically or acoustically coupled to the shell; and
the external acoustic sensor is mechanically or acoustically coupled to the shell; and
an audio sound processor configured to receive or transmit audio signals via a data bus, wherein the audio signals are used for music or speech playback in the shell interior of the helmet.

2. The system of claim 1, further comprising at least one further internal acoustic sensor, wherein at least one of the internal acoustic sensor and the at least one further internal acoustic sensor is disposed around or in front of the at least one loudspeaker.

3. The system of claim 2, further comprising at least one combiner that couples the active noise control processor to the internal acoustic sensor and the at least one further internal acoustic sensor.

4. The system of claim 1, wherein:
the active noise control processor comprises a feedback structure or a combined feedforward-feedback structure;
the active noise control processor is configured to receive an error signal; and
at least one of the internal acoustic sensor, the at least one further internal acoustic sensor or the combiner are configured to provide the error signal.

5. The system of claim 1, wherein:
the active noise control processor comprises a feedforward structure or a combined feedforward-feedback structure;
the active noise control processor is configured to receive a reference signal; and
at least one of the non-acoustic sensor and the external acoustic sensor is configured to provide the reference signal.

6. The system of claim 1, wherein at least one of the internal acoustic sensor, at least one further internal acoustic sensor, and the external acoustic sensor is a microphone.

7. The system of claim 1, wherein the non-acoustic sensor is an acceleration sensor.

8. The system of claim 1, wherein the active noise control processor is further configured to receive and process at least one undesired-sound reference signal representative of sound generated by a vehicle.

9. The system of claim 8, further comprising a first signal synthesizer that is configured to synthesize the at least one undesired-sound reference signal from a signal representative of at least one operational characteristic of the vehicle.

10. The system of claim 1, wherein the active noise control processor comprises at least one of a fixed filter, a controllable filter, and an adaptive filter.

11. An automatic noise control method for a helmet with a rigid shell that is configured to spatially divide a shell interior from a shell ambiance; the method comprising:
generating in connection with at least one loudspeaker disposed in the shell interior, anti-sound in the shell interior based on at least one input signal, the anti-sound configured to attenuate sound occurring in the shell interior through destructive superposition;
providing the at least one input signal by at least one of:
picking up sound in a vicinity of the at least one loudspeaker in the shell interior;
picking up vibrations of the shell; and
picking up sound in a vicinity of a shell exterior; and
receiving or transmitting audio signals at an audio signal processor via a data bus, wherein the audio signals are used for music or speech playback in the shell interior of the helmet.

12. The method of claim 11, further comprising picking up sound in the shell interior at at least one position around or in front of the at least one loudspeaker to provide a multiplicity of input signals to an active noise control processor.

13. The method of claim 12, further comprising combining the multiplicity of input signals corresponding to the picked-up sound in the shell interior at a multiplicity of positions around or in front of the at least one loudspeaker and providing at least one combined input signal.

14. The method of claim 12, wherein:
the active noise control processor comprises a feedback structure or a combined feedforward-feedback structure;
the active noise control processor is configured to receive an error signal; and
the error signal is provided by the at least one input signal corresponding to at least one of the picked up vibrations of the shell and the sound picked up in the vicinity of the shell exterior.

15. The method of claim 12, wherein:
the active noise control processor comprises a feedforward structure or a combined feedforward-feedback structure;
the active noise control processor is configured to receive a reference signal; and
the reference signal is provided by the at least one input signal corresponding to sound picked up in the vicinity of the at least one loudspeaker in the shell interior.

16. The method of claim 11, wherein at least one of picking up sound in the vicinity of the at least one loudspeaker in the shell interior and picking up sound in the vicinity of the shell exterior is performed using a microphone.

17. The method of claim 11, wherein picking up vibrations of the shell is performed using an acceleration sensor.

18. The method of claim 12 further comprising receiving and processing at least one undesired-sound reference signal representative of sound generated by a vehicle with the active noise control processor.

19. The method of claim 18, further comprising synthesizing the at least one undesired-sound reference signal from a signal representative of at least one operational characteristic of the vehicle.

20. The method of claim 12, wherein the active noise control processor comprises at least one of a fixed filter, a controllable filter, and an adaptive filter.

21. An automatic noise control system comprising:
a helmet including a rigid shell and having a shell interior;
at least one loudspeaker disposed in the shell interior;
an active noise control processor configured to generate in connection with the at least one loudspeaker, anti-sound in the shell interior based on at least one input signal, the anti-sound configured to attenuate sound that occurs in the shell interior through destructive superposition;
at least one sensor configured to provide the at least one input signal, the at least one sensor being at least one of an internal acoustic sensor, a non-acoustic sensor and an external acoustic sensor; wherein:
the internal acoustic sensor is disposed in a vicinity of the at least one loudspeaker in the shell interior;
the non-acoustic sensor is mechanically or acoustically coupled to the shell; and
the external acoustic sensor is mechanically or acoustically coupled to the shell; and
an audio sound processor configured to receive or transmit audio signals via a data bus, wherein the audio signals are used for music or speech playback in the shell interior of the helmet.

* * * * *